INVENTOR.
RICHARD H. LONG
BY
ATTORNEY

Dec. 15, 1953   R. H. LONG   2,662,621
TRANSMISSION CONTROL MECHANISM
Filed Dec. 16, 1949   3 Sheets-Sheet 3

INVENTOR.
RICHARD H. LONG
BY H. O. Clayton
ATTORNEY

Patented Dec. 15, 1953

2,662,621

UNITED STATES PATENT OFFICE 2,662,621

TRANSMISSION CONTROL MECHANISM

Richard H. Long, South Bend, Ind., assignor to Bendix Aviation Corporation, South Bend, Ind., a corporation of Delaware Application December 16, 1949, Serial No. 133,317

3 Claims. (Cl. 192—.092)

This invention relates in general to the power transmission mechanism of the power plant of an automotive vehicle and in particular to power and manually operated means for operating the change speed transmission of said power plant and for operating the friction clutch to facilitate the operation of the transmission.

One of the objects of my invention is to provide, in an automotive vehicle including a friction clutch and a three-speeds forward and reverse transmission, a simple mechanism, power operated in part, for operating said transmission, the low gear and reverse gear settings thereof being effected by a manual operation of the transmission and the second and high gear settings of the transmission be'ng effected by power means, said operations being facilitated by a power operation of the friction clutch.

A further object of my invention is to provide, in an automotive vehicle including a power plant comprising an accelerator, a friction clutch, a three-speeds forward and reverse transmission, and a gear shift lever, means for operating and for facilitating the operation of said transmission including power means, comprising a plurality of motors, which are automatically operable, after the shift lever is placed in its high gear position and the accelerator is released, to alternately establish the transmission in its second and high gear settings depending upon the speed of the vehicle, the friction clutch being operated by one of said motors to facilitate this operation of the transmission, said means further including means for effecting, at the will of the driver, either a neutralization of the transmission or a second gear setting thereof the clutch being operated to facilitate such operations.

One of the principal features of my invention is to include, in a mechan;sm for operating a three-speeds forward and reverse transmission and a friction clutch, means, operable at the will of the driver, for overruling an automatic operation of the mechanism, to thereby establish the transmission in its second gear setting, the clutch being operated to facilitate this operation of the transmission.

Yet another object of my invention is to provide a simple power operated mechanism adapted to operate the transmission and clutch of an automotive vehicle the controls for said mechanism including a gear shift lever operated selector switch mechanism, a switch mechanism actuated by the transmission, and a switch mechanism actuated by a vehicle speed responsive governor.

A further object of my invention is to provide a transmission and clutch operating mechanism adapted to be used in an automotive vehicle, said mechanism being controlled in part by a switch mechanism actuated by a manually operated gear shift lever and a switch mechanism actuated by the transmission.

Yet another object of my invention is to provide a simple and compact manually and power operated means for operating the transmission and clutch of an automotive vehicle the only manually operated controls for said means being those operated by the accelerator and gear shift lever of the vehicle.

The above and other objects and features of the invention will appear more fully hereinafter from a consideration of the following description taken in connection with the accompanying drawings where one embodiment of the invention is illustrated by way of example.

F;gure 1 is a diagrammatic view of my invention disclosing the principal features thereof;

Figure 6 is a view disclosing the principal portion of the linkage interconnecting the accelerator, the throttle and the clutch control valve.

Figure 1:
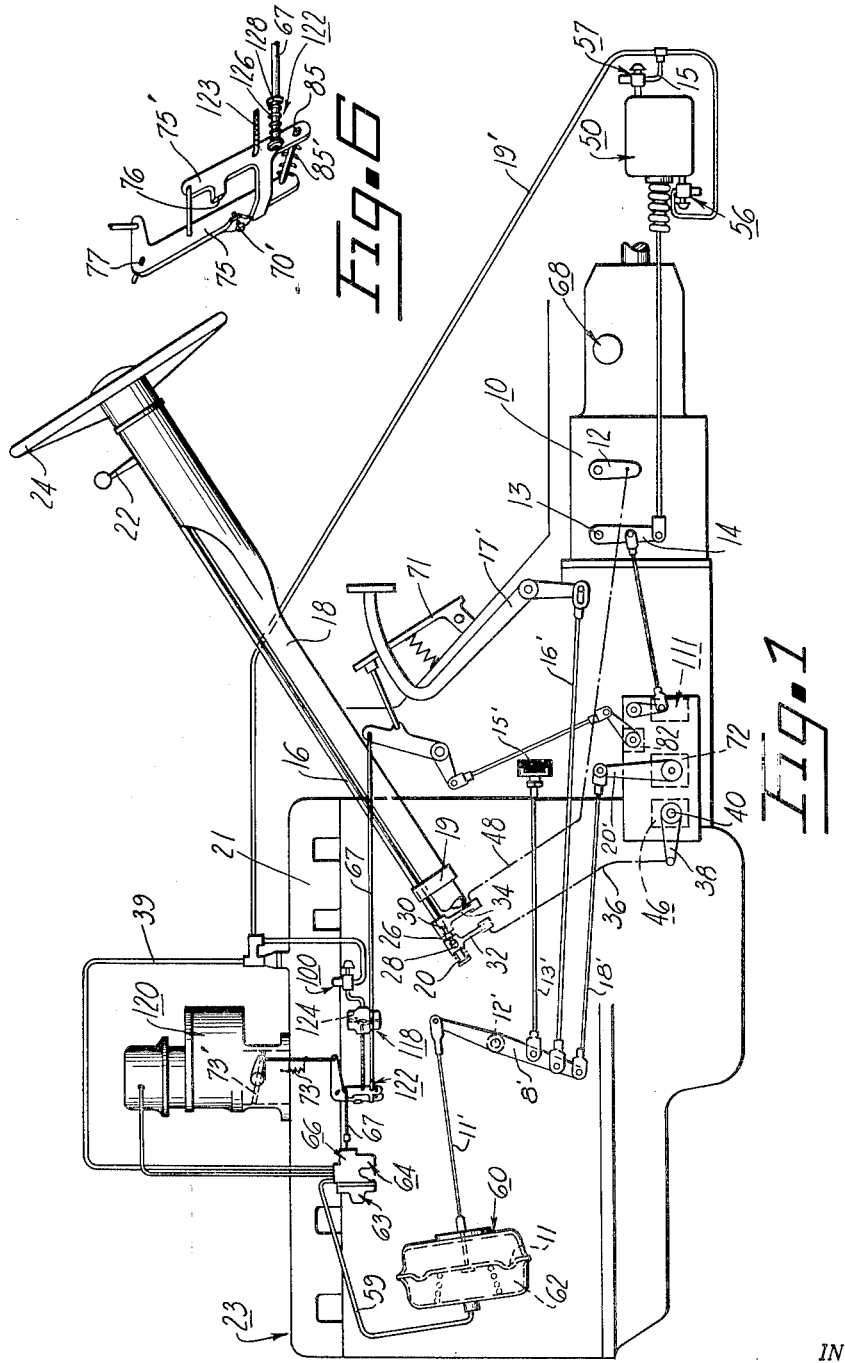

Referring now to Figure 1 disclosing a preferred embodiment of my invention a three-speeds forward and reverse transmission 10 of an automotive vehicle is operated by means of a manually operated crank 12 and a power operated crank 14 the crank 12 serving to operate the transmission to establish the same in either its low gear setting or its reverse gear setting and the crank 14 serving to operate that part of the transmission serving to establish the same in its second gear setting or its high gear setting. The crank 14 may be connected to a gear operating shaft 13 operably connected to the shift rail or its equivalent for establishing the transmission in either second or high gear. The linkage for actuating the cranks 12 and 14 is disclosed in Figure 1 and includes a rod 16 secured to the steering post 18 by brackets 19. This rod, which is biased downwardly by a spring 20, is bodily and rotatably actuated by a manually operated gear shift lever 22 conveniently positioned beneath the steering wheel 24. A pin 26, mounted on the lower end of the rod 16, is adapted to fit within one or the other of slots 28 and 30 in the ends of cranks 32 and 34 respectively. The shift lever 22 is moved in an H pattern in effecting the operation of the mechanism of my invention and is biased downwardly, away from the steering wheel, by the operation of the spring 20. The latter operation serves to nest the pin 26 within the slot 28 preparatory to effecting an automatic operation of the mechanism or a second gear operation thereof; and when the driver lifts the shift lever 22 upwardly toward the steering wheel the pin 26 is moved into the slot 30 preparatory to effecting either a low gear operation of the transmission or a reverse gear operation thereof.

Figure 2:
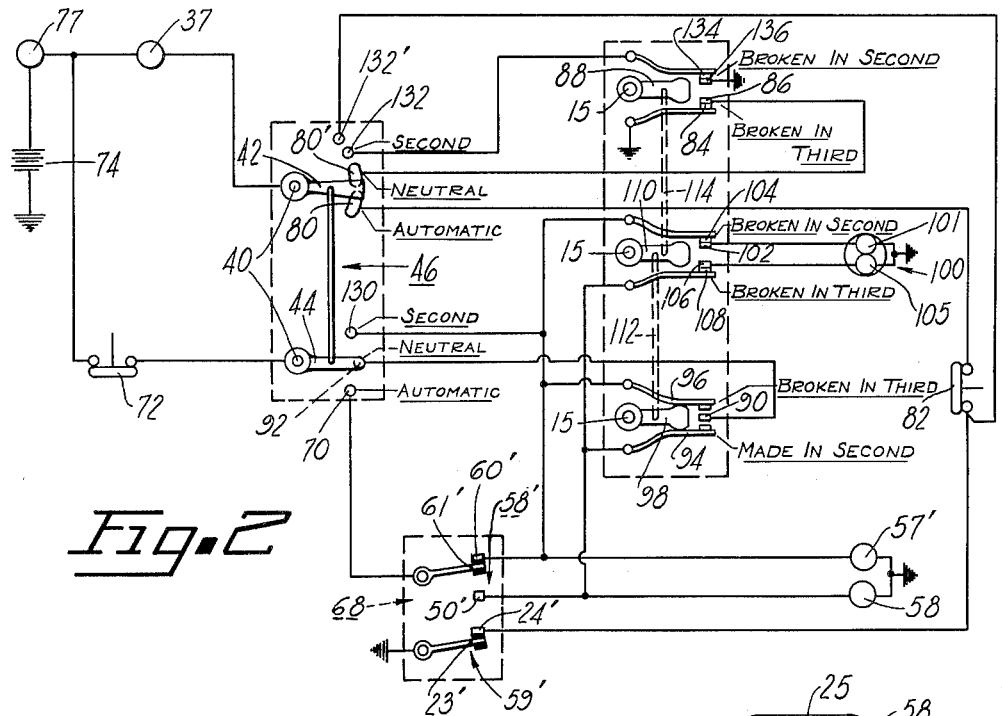
Figure 2 is a wiring diagram of the electrical mechanism disclosed in Figure 1.

The crank 32 is preferably connected, by a link 36, with a crank 38 which serves to rotate a shaft 40; and, as is disclosed in Figure 2, to this shaft there are secured movable switch members 42 and 44 of a selector switch mechanism indicated as a whole by the reference numeral 46. The selector switch mechanism constitutes one of the principal controls of the mechanism of my invention and serves as a part of the controls for both the clutch control mechanism of the invention and the transmission control mechanism thereof. The crank 34 is preferably connected, by a link 48, to the aforementioned low and reverse gear operating crank 12.

Figure 3:
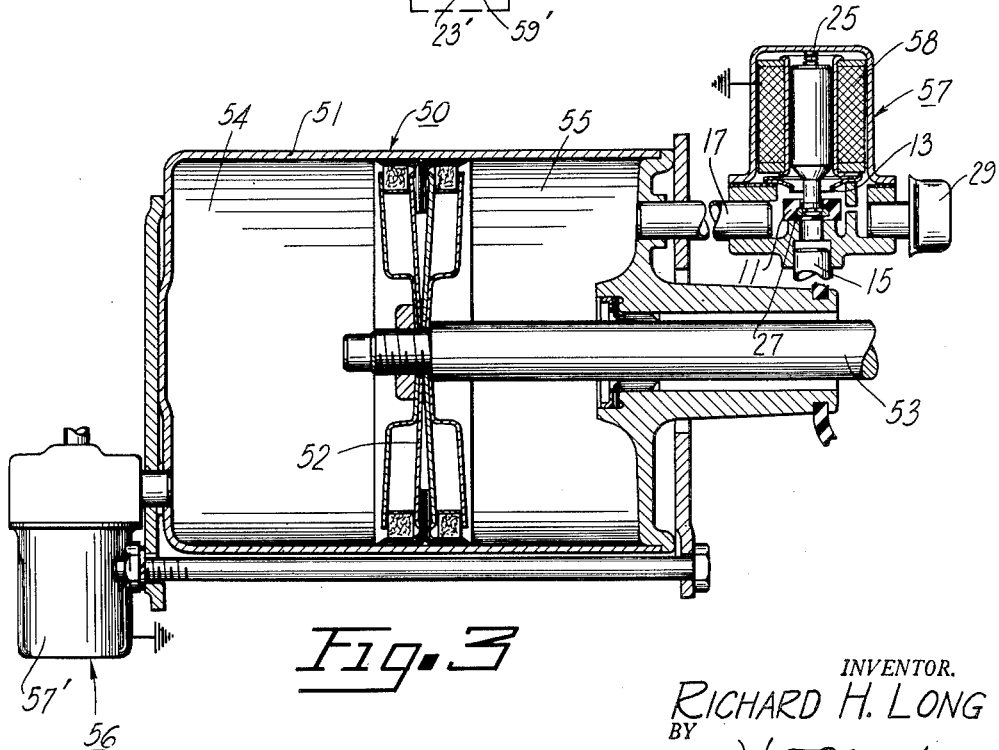
Figure 3 is a sectional view of the transmission operating pressure differential operated motor of my invention together with the valvular means for controlling said motor.

The second and high gear operating crank 14 is preferably actuated by a double acting pressure differential operated motor 50 which is disclosed in detail in Figure 3. This motor includes a casing 51 housing a piston 52 operably connected, by a rod 53, to the crank 14. The casing and piston together provide two control compartments 54 and 55 the pressure of the air within said compartments being controlled, respectively, by solenoid and spring operated three-way valves 56 and 57. Describing the operation of valve 57, energization of a solenoid 58 serves to seat a valve member 11 at 13 to interconnect a conduit 15 with a conduit 17. The conduit 15 is connected to a conduit 19' leading to the intake manifold 21 of the internal combustion engine 23 of the vehicle; and the conduit 17 is connected to the control compartment 55 of the motor 50. When the solenoid 58 is de-energized a spring 25 serves to seat the valve 11 upon a seat 27 thereby cutting off the vacuum connection and venting the compartment 55 to the atmosphere via an air cleaner 29, the interior of the valve mechanism and the conduit 17. The spring 25 serves to bias the valve member 11 to the position disclosed in Figure 3, that is the position to vent the compartment to the atmosphere. The solenoid and spring operated three-way valve 56 is a duplicate of the valve 57, accordingly a description thereof is unnecessary. The solenoid for operating the valve is indicated by the reference numeral 57'.

Now to effect an operation of the transmission 10 it is necessary to take the load off of the engine driven driving gears thereof preparatory to effecting an operation of the motor 50; accordingly, in the embodiment of my invention disclosed in the drawings I provide power operated means for operating the friction clutch of the vehicle, said operation being synchronized with the operation of the transmission. To this end there is provided a single acting pressure differential operated motor 60 the gaseous pressure within the control chamber 62 thereof being controlled by a solenoid and spring operated three-way valve 64, Figure 5, and an accelerator and motor operated three-way valve 66, Figure 4. No claim is made to this control valve mechanism inasmuch as the same is disclosed and claimed in the U. S. application of Harold W. Price et al. No. 740,158, filed April 8, 1947. The power element or piston 11 of the motor 60 is preferably connected, by a rod 11', to a crank 8' pivoted at 12'; and this crank is connected, by a link 13', with the clutch 15' of the vehicle. The crank 8' is also connected, by a link 16', to a foot operated clutch pedal 17'; and said crank 8' is also connected, by a link 18', with a crank 20' which actuates a switch 72 referred to hereinafter.

Figure 4:
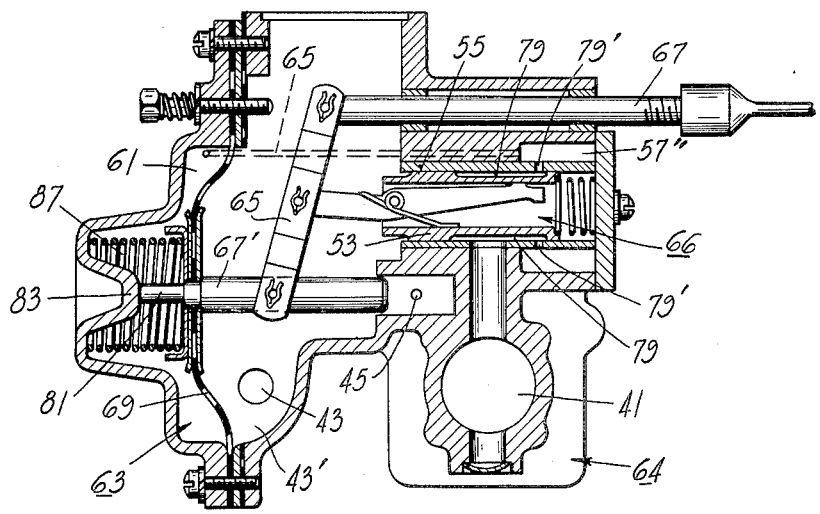
Figure 4 is a sectional view disclosing details of a portion of the valve means for controlling the clutch operating motor.
Figure 5:
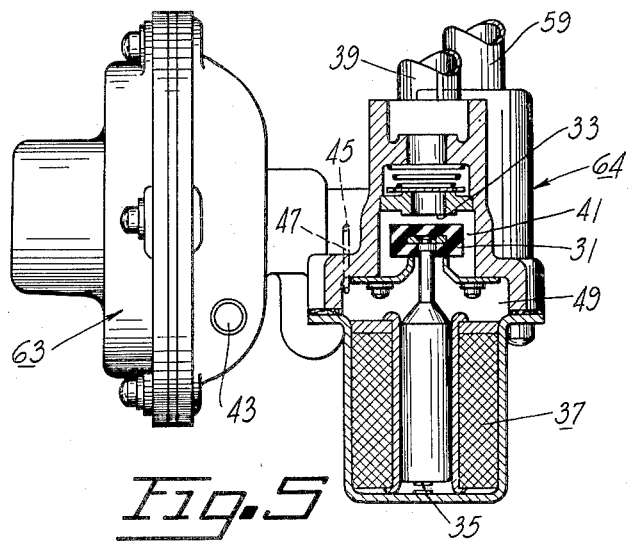
Figure 5 is another sectional view disclosing other details of the clutch control valve means.

The valve 64 comprises a valve member 31 which is biased, by a spring 35, to seat at 33 and which is moved to the position disclosed in Figure 5 by an energized solenoid 37. When the solenoid is energized the valve mechanism 64 is operative to connect a conduit 39 with a valve compartment 41, Figure 4; and when the solenoid is de-energized the spring 35 becomes operative to vent the compartment 41 to the atmosphere via an opening 43, in the valve casing, Figure 4, leading to an air cleaner, not shown, a motor compartment 43', a port 45, a duct 47, Figure 5, and compartments 49, the latter being directly connected to the compartment 41. The conduit 39 is connected with the intake manifold as a source of vacuum.

As disclosed in Figure 4 the motor and accelerator operated valve 66 includes a cylindrically shaped valve member 53 slidably mounted within a valve casing 55. A manifold portion 57'' of the valve mechanism is connected to the vacuum motor 60 by a conduit 59 and said portion is also connected to a compartment 61 of a vacuum motor 63, by a duct 65. The valve member 53 is actuated, to operate the valve, by means of a floating lever 65' which is connected, at one of its ends, to an accelerator operated link 67 and at its other end to a link 67' connected to the power element 69 of the motor 63.

Describing the operation of the valve mechanism 66 when the accelerator 71 of the vehicle is released to idle the engine, a spring 73 connected to the throttle valve 73' serves to rotate levers 75 and 75' as a unit about a pivot 77 to close the throttle valve and move the valve member 53 slightly to the right of the position disclosed in Figure 4. The control compartment 62 of the motor 60 and the control compartment 61 of the motor 63 are then connected to the intake manifold via the then open valve 64, the compartment 41, a recess 79 in the valve member 53, ports 79', the manifold 57'', the duct 65 and the conduit 59. The single acting motor 60 is then energized to disengage the clutch and the motor 63 is energized to move a stop 81, connected to the rod 67', into contact with a boss 83.

To engage the clutch the accelerator is depressed thereby rotating the lever 75' about a pivot 85 against the tension of a spring 85'; and this movement of the lever 75' is arrested when a flange 76 on said lever abuts an adjustable stop 70' on the lever 75. The spring 85' is weaker than the spring 73, accordingly, the valve member 66 will be actuated before the throttle 73' is opened. The operation of the valve 66 serves to vent the motor 60 to the atmosphere via the port 43, the chamber 43' of the motor 63, the interior of the hollow valve 66, the ports 79', the valve manifold 57'' and the conduit 59. The venting of the motor 60 serves to effect an engagement of the clutch the operation of a spring 87 together with the lowering of the differential of pressures acting upon the power element 69 serving to move the valve 66 to its lapped position. The parts of the mechanism are so constructed and arranged and so operative that the valve is lapped to effect an arresting of the movement of the movable clutch plate just as the driving and driven clutch plates are about to contact or just as they first contact. There is thus effected what is known as a first stage operation of the clutch control mechanism.

A subsequent depression of the accelerator, to effect a second stage operation of the mechanism, serves to rotate the levers 75 and 75' as a unit about the pivot 85 to open the throttle 73' and again operate the valve 66. When the throttle opening movement of the accelerator is then again arrested there results another lapping of the valve 66 to continue the operation of engaging the clutch, the plates thereof being pressed into engagement by the clutch springs by a force dependent, among other factors, upon the degree of gaseous pressure within the control compartment 61 of the motor 63.

Continuing the description of the controls for the clutch operating motor 60 and the transmission operating motor 50 the grounded solenoids 58 and 57', Figures 2 and 3, are preferably electrically connected in parallel with a single pole double throw portion 58' of a multi-stage governor operated switch mechanism 68 no claim to which is made. This switch mechanism 68 also includes a clutch control switch mechanism to be discussed hereinafter. The switch portion 58' includes a common contact 61' and two fixed contacts 60' and 50' said three contacts providing a switch 61', 60' and a switch 50', 61'. The common contact 61' of this double throw portion of the switch mechanism is electrically connected to a fixed contact 70 of the shift lever operated selector switch mechanism 46; and the movable contact 44 of the latter mechanism is preferably electrically connected to a clutch motor operated breaker switch 72 which is in turn electrically connected in series with the ignition switch 77 of the car and a grounded battery 74 or other source of electricity. The clutch operated breaker switch 72 is closed when the clutch motor is energized to disengage the clutch; and is opened when said motor is de-energized to engage the clutch. The governor, not shown, of the governor operated switch mechanism 68 is preferably vehicle speed responsive and said mechanism 68 preferably includes a single pole single throw portion 59'. This portion of the switch mechanism includes a grounded movable contact 23' and a fixed contact 24'.

There is thus provided means for effecting an automatic operation of the transmission operating motor 50 to shuttle the transmission back and forth between its high and second gear settings; for at a vehicle speed, say below 13 miles per hour, the switch 60', 61' is closed thereby energizing the solenoid 57' to operate the valve 56 to effect a second gear setting of the transmission; then when the speed of the vehicle exceeds 13 miles per hour solenoid 58 is energized to operate the valve 56 to effect the high gear setting of the transmission. As is disclosed in Figure 2 the shift lever must be placed in its automatic setting to effect this operation of the mechanism; furthermore, the clutch must first be disengaged to close the switch 72 before said operation may be effected.

Continuing now the description of the electrical means for controlling the clutch operating motor 60 the aforementioned movable contact 42 of the clutch control portion of the selector switch mechanism 46 is electrically connected to the valve operating solenoid 37, Figures 2 and 5, and is adapted, when the shift lever 22 is in either its automatic position or its transmission neutral position, to contact both a fixed contact 80 electrically connected to an accelerator operated breaker switch 82 and a fixed contact 80' electrically connected to the contact 86; and the switch 82 is electrically connected to the fixed contact 24' of the governor operated switch 59'.

Electrically connected in parallel with the series connected switches 59' and 82 there is provided a grounded switch preferably including a grounded movable contact 84 and a fixed contact 86. The movable contact 84 is biased to its switch closed position by a spring, not shown, and is actuated, to open the switch, by a crank 88 connected to motor operated shift rail operating shaft 15. The parts of the mechanism are so constructed and arranged and so operative that when the transmission is established in its high gear setting the switch 84, 86 is open; and at all other times, that is when the transmission is in neutral or in any other setting, said switch is closed.

There is thus provided power operated means for operating the friction clutch of the vehicle to facilitate an operation of the transmission; for when the driver releases the accelerator to idle the engine and opens the valve 66, and moves the shift lever to its automatic, that is, high gear position, the transmission at the time being established in any setting except high gear, then the motor 60 is energized to effect a disengagement of the clutch. If the vehicle is traveling in high gear, then the motor 60 may be energized to disengage the clutch provided the accelerator is released to open the valve 66 and close the switch 82, and the speed of the vehicle is reduced sufficiently to effect a closing of the governor operated switch 59'.

Describing now an important feature of my invention there is provided means for neutralizing the transmission by an operation of the motor 50. A switch including a fixed contact 90 electrically connected to a fixed neutral switch contact 92 of the switch mechanism 46 and a movable contact 94 is electrically connected in series with the grounded second gear controlling solenoid 58; and a switch including a fixed contact 90 and a movable contact 96 is electrically connected in series with the high gear controlling solenoid 57', Figure 3. The switches 90, 94 and 90, 96 are biased to their closed positions by springs, not shown, and are opened by an operation of a crank 98 which is actuated, through the intermediary of a shaft 15, by the motor operated crank 14, Figure 1. As indicated by the legends in Figure 2, the parts of the mechanism are so constructed and arranged and so operative that when the transmission is established in its second gear setting the switch 90, 94 is closed and when the transmission is established in its high gear setting the switch 90, 96 is closed. When the transmission is established in its neutral setting the parts of the mechanism take the position disclosed in Figure 2 both switches 90, 94 and 90, 96 being then opened.

Describing another feature of my invention there is provided means for automatically closing the throttle when the mechanism is functioning to operate the transmission. With such a means included in the mechanism the throttle will be held closed during an operation despite a depression of the accelerator. This throttle closing means preferably includes a grounded double wound solenoid 100 for operating a three-way valve one of the grounded windings 101 of the solenoid being wired in series with a transmission operated breaker switch 102, 104 and the governor operated switch 60', 61'; and the other grounded winding 105 of the solenoid is wired in series with a transmission operated breaker switch 106, 108 and the governor operated switch 50', 61'. The switches 102, 104 and 106, 108 are operated by a crank 110 which is connected to the crank 98 by a link 112 and to the crank 88 by a link 114 the parts being so constructed and arranged and so operative that the switch 104, 102 is opened when the transmission is established in its second gear setting and the switch 106, 108 is opened when the transmission is established in its third, that is high gear setting. The motor operated switches actuated by the simultaneously movable cranks 88, 98, and 110 are indicated as a whole by the reference numeral 111 in Figure 1. The solenoid 100 serves, together with a spring, not shown, to operate a three-way valve, not shown, which controls a single acting pressure differential operated motor 118 which may be mounted adjacent the throttle valve 73' of the carburetor 120. The accelerator 71 is connected, by a yieldable connection 122, with the lever 75'; and the power element of the motor 118 is connected, by a flexible connection 123, with said lever. When the motor 118 is energized the power element thereof moves to the right, Figure 1, taking up the slack in the connection 123 to thereby prevent a throttle opening movement of the crank 75'; and when the motor 118 is de-energized a return spring 124 therein moves the power element of the motor to the left, Figure 1, thereby permitting an unimpeded operation of the throttle 73' and valve 66 by the accelerator.

Describing the operation of the yieldable connection 122, a pre-loaded spring 126 sleeved over the rod 67 and positioned between the lever 75' and a flange 128 secured to the said rod, serves, with a normal operation of the throttle, as a throttle and valve operating force transmitting means between the accelerator and the parts to be operated; however, when the throttle is closed by an operation of the throttle closing motor 118 then a depression of the accelerator merely serves to further compress the spring 126, the end of the rod 67 then sliding through an opening in the lever 75'. It is apparent therefore that when the throttle is closed by an operation of the motor 118 the driver may depress the accelerator without damaging or putting an undue strain on the connections between the throttle and accelerator.

An important feature of my invention lies in means, operable at the will of the driver, for establishing the transmission in its second gear setting the clutch being operated as part of this operation. With such a mechanism the driver may at any time, and despite a relatively high speed of the vehicle, overrule the operation of the governor switch 68 in its operation of establishing the transmission in its high gear setting.

Describing this mechanism the gear shift lever selector switch mechanism 46 includes a fixed contact 130 and fixed contacts 132 and 132' the contact 130 being electrically connected with the switch 102, 104 and the contacts 132 and 132' being electrically connected, respectively, to the movable contact 134 of a transmission operated switch 134, 136 and to the electrical connection between the switches 82 and 23', 24'. The movable contact 134 is biased by a spring, not shown, to its switch closed position and the parts of the mechanism are so constructed and arranged and so operative that the switches 134, 136 and 102, 104 are opened only when the transmission is established in its second gear setting. The fixed contact 136 of the switch 134, 136 is grounded and the movable contact 134 is actuated, to open the switch by the motor operated crank 88.

Describing the operation of the second gear overrule mechanism it will be assumed that the vehicle is approaching the base of a mountain and is traveling above both stages of governor speed. To facilitate the climbing of the mountain the driver will place the gear shift lever in its second gear setting and this operation serves to move the contact 42 into contact with both of the contacts 132 and 132' resulting in an energization of the solenoid 37 thereby opening the valve 64 to provide a source of vacuum for the clutch operating motor 60. Then when the valve 66 is opened by releasing the accelerator the motor 60 is energized to disengage the clutch; and this operation serves to effect a closing of the breaker switch 72 thereby providing a source of electricity to operate the transmission operating motor 50. It will be remembered that when the gear shift lever is moved to its second gear position, the switch 44, 130 is closed and with the closing of this switch and the closing of switch 72, there results an energization of the solenoid 57' to effect a second gear operation of the motor 50; then as this setting of the transmission is being completed the switch 134, 136 is opened thereby de-energizing the motor 60 to permit the clutch springs to operate to re-engage the clutch. Thereafter in the event the vehicle is appreciably slowed down the clutch will be disengaged by virtue of the closure of the switches 42, 132' and 23', 24'.

It is also to be noted that the placing of the transmission in second gear by the overrule mechanism of my invention serves as an aid in breaking, that is decelerating, the vehicle when the same is coasting downhill.

Describing now the complete operation of the mechanism of my invention it will be assumed that the accelerator is closed to idle the engine thereby making of the intake manifold 21, a source of vacuum to energize the motors 50, 60, and 118. The vehicle being at a standstill and the transmission in neutral, the parts will then assume the positions disclosed in Figure 2. The driver will then probably wish to place the transmission in its low gear setting whereupon he will operate the gear shift lever to effect this result the clutch at the time being disengaged by an operation of the motor 60. To get the vehicle under way the driver will then depress the accelerator thereby effecting a closing of the valve 66 to effect a clutch engaging operation of the motor 60; and it is to be remembered that when the speed of the vehicle is below 13 miles per hour the governor operated switch 61', 60' will be closed preparatory to effecting a second gear operation of the motor 50. Then when the accelerator is then again released the clutch motor 60 is again energized to disengage the clutch and this operation closes the switch 72 in preparation for an operation of the mechanism to place the transmission in second gear.

The driver will then place the shift lever 22 in its automatic, that is high gear position thereby effecting an operation of the motor 50 to establish the transmission in its second gear setting; and a subsequent depression of the accelerator results in a re-engagement of the clutch to accelerate the vehicle in this setting. When the speed of the vehicle exceeds governor speed the switch 50′, 61′ is closed preparatory to effecting a high gear operation of the mechanism; and this operation is then effected when the driver releases the accelerator to open the valve 66 to effect a clutch disengaging operation of the motor 60; for the latter operation serves to again close the switch 72. The transmission will then, with an operation of the governor operated switch 58′, and the accelerator operated valve 66, shuttle back and forth between its high and second gear settings the particular setting depending upon the speed of the vehicle.

With the manually and power operated mechanism of my invention the driver may, solely by an operation of the accelerator and the shift lever, place the transmission in its second gear setting thereby overruling the operation of the governor 68, furthermore, he may place the transmission in its reverse gear setting and he may, with the car at a standstill, neutralize the transmission.

Describing the latter operation we will assume that the transmission is established in its second gear setting. The switch 90, 94 is then closed in preparation for a transmission neutralizing operation of the motor 50; and it is to be noted at this juncture that when the transmission is established in its high gear setting the switch 90, 96 is closed in preparation for a transmission neutralizing operation of the motor 50.

Then when the driver places the shift lever in its neutral setting and switch 72 is closed by disengaging the clutch, the mechanism is operative to effect a neutralization of the transmission. When the latter operation is completed the crank 98 assumes the position disclosed in Figure 2 thereby breaking the electrical circuit to the neutral contact 90; and this operation results in a stopping of the motor piston 52 in its transmission neutral position.

Although only one embodiment of the invention has been illustrated and described, various changes in the form and relative arrangements of the parts may be made to suit requirements.

I claim:

1. In an automotive vehicle provided with a three-speeds forward and reverse transmission, a friction clutch and an accelerator, means for operating the transmission and clutch including a double acting pressure differential operated motor for shuttling the transmission back and forth between its second and high gear settings, valve means for controlling the operation of said motor, a motor for operating the clutch, valve means for contrlling the operation of the latter motor, and means for establishing the transmission in its low and reverse settings and for controlling the operation of both of said valve means including a manually operated shift lever, force transmitting means interconnecting said lever with the transmission to effect the low and reverse settings thereof, a selector switch mechanism for controlling the operation of both valve means, force transmitting means interconnecting the selector switch mechanism with the shift lever, both force transmitting means being so constructed and arranged that they are disconnected from each other when the shift lever is actuated to operate the selector switch mechanism, a transmission operated switch mechanism for controlling the operation of both valve means, a vehicle speed responsive governor operated switch mechanism operative to control the operation of both valve means, other electrical means for controlling the operation of the valve means including a source of electricity, a breaker switch operated by the clutch operating motor, and an electromagnetic means for controlling the operation of the valve means for controlling the operation of the transmission operating motor; the source of electricity, the breaker switch, and a part of the selector switch mechanism being electrically connected in series and a part of the governor operated switch mechanism and the electromagnetic means being electrically connected and electromagnetic means for controlling the operation of a part of the valve means for controlling the operation of the clutch operating motor, the source of electricity, the latter electromagnetic means, a part of the selector switch mechanism, a part of the transmission operated switch mechanism, the accelerator operated switch and a part of the governor operated switch mechanism being electrically connected together.

2. Mechanism adapted to be used to operate the clutch and change speed transmission of an automotive vehicle including a double acting pressure differential operated motor for operating the transmission, a pressure differential operated motor for operating the clutch, valve means for controlling the operation of the transmission operating motor, valve means for controlling the operation of the clutch operating motor, means, including grounded electromagnetic means, for operating the transmission controlling valve means, means for controlling the operation of said electromagnetic means including a governor operated switch mechanism comprising two fixed contacts and a movable contact, the two fixed contacts being electrically connected to the transmission controlling electromagnetic means, a selector switch and a switch operated by the clutch operating motor, the latter two switches and the movable contact being electrically connected in series with each other; means, including electromagnetic means, for operating the clutch controlling valve means, means for controlling the operation of the latter electromagnetic means including a selector switch comprised of fixed contacts, a grounded switch mechanism adapted to be operated by the transmission said mechanism including contacts electrically connected to the latter fixed contacts, a switch adapted to be actuated by the accelerator of the vehicle, and a governor operated switch, the latter two switches being electrically connected in a circuit which is in parallel with the grounded transmission operated switch mechanism; together with manually operated means for simultaneously operating the two selector switches.

3. The combination with a three-speeds forward and reverse transmission mechanism and a friction clutch mechanism in an automotive vehicle, of means for operating said mechanisms including a manually operated gear shift lever adapted to be mounted adjacent the steering wheel of the vehicle, a foot operated accelerator pedal adapted to operate the throttle of the vehicle, a vehicle speed responsive governor, a double acting pressure differential operated motor connected with the transmission and operable to alternately establish the same in its second and high gear settings, a pressure differential operated motor operably connected to the clutch, force transmitting means inter-connecting the shift lever and transmission and serving, when actuated, to establish the transmission either in its reverse gear setting or its low gear setting, valve means for controlling the operation of the transmission operating motor, electrical means for controlling the operation of said valve means including a source of electricity comprising a plurality of grounded solenoids, a gear shift lever operated selector switch mechanism including three fixed contacts one of which is connected to one of the solenoids, a governor operated switch mechanism connected to one of the fixed contacts, a transmission operated switch mechanism connected to one of the fixed contacts and to the solenoid, and a switch mechanism operated by the clutch operating motor and connected to the source of electricity and to the selector switch mechanism; valve means for controlling the operation of the latter motor, electrical means for controlling the operation of the latter valve means including a gear shift lever operated selector switch mechanism including a plurality of fixed contacts, a transmission operated switch mechanism including contacts electrically connected to the latter contacts, an accelerator operated switch and a grounded switch operated by the governor said two latter switches being electrically connected in series to one of the latter fixed contacts, the parts of the aforementioned mechanism being so constructed and arranged and so operative that the transmission may, by a manual operation of the gear shift lever, be operated to establish the transmission in its reverse and low gear settings and power operated, to alternately establish the transmission in second and high gear settings, by placing the shift lever in a certain setting, the clutch being operated by operation of the accelerator, the shift lever, the governor and the transmission to facilitate the operation of the transmission.

RICHARD H. LONG.

References Cited in the file of this patent
UNITED STATES PATENTS

| Number | Name | Date |
|---|---|---|
| 1,911,599 | Bloxsom | May 30, 1933 |
| 2,234,463 | Brewer | Mar. 11, 1941 |
| 2,235,943 | Mylius | Mar. 25, 1941 |
| 2,263,400 | Schwarz | Nov. 18, 1941 |
| 2,296,289 | Mayrath | Sept. 22, 1942 |
| 2,447,730 | Britton | Aug. 24, 1948 |
| 2,492,923 | Moore et al. | Dec. 27, 1949 |